United States Patent Office 3,197,941
Patented Aug. 3, 1965

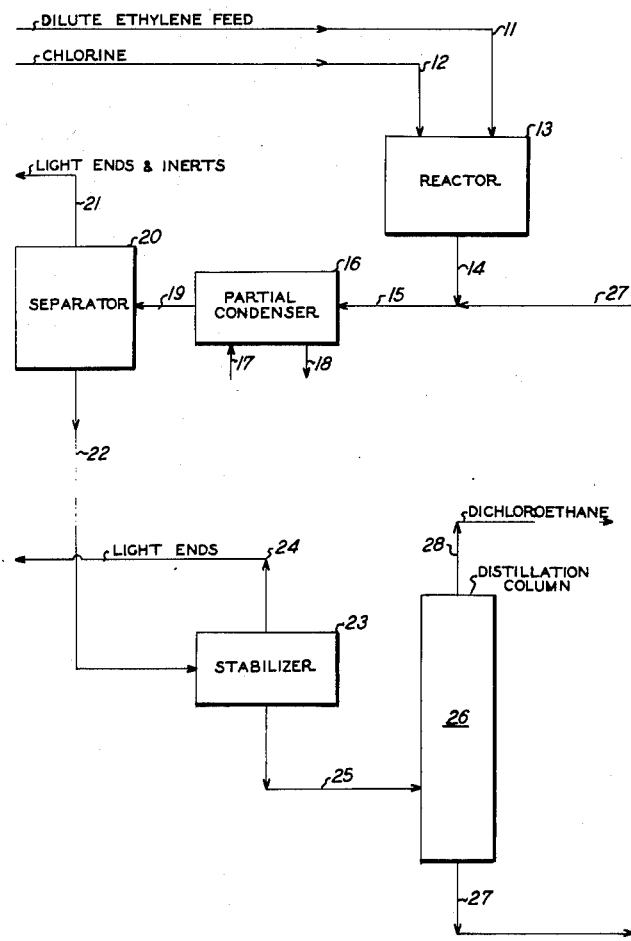

3,197,941
CHEMICAL PROCESS FOR THE RECOVERY OF DICHLOROETHANE
John White Colton, Pelham Manor, and Martin Barry Sherwin, Brooklyn, N.Y., assignors to Halcon International, Inc., a corporation of Delaware
Filed June 27, 1960, Ser. No. 38,788
5 Claims. (Cl. 55—48)

This invention relates to preparation of 1,2 dichloroethane by reacting ethylene with chlorine, and more particularly to a process for the recovery of the dichloroethane from dilute reaction mixtures thereof, and especially such a process wherein the dilute mixture is contacted with a higher boiling liquid absorbent for the dichloroethane and cooled, low boiling materials are removed, and 1,2 dichloroethane product is recovered as a distillate from the resulting mixture. A preferred liquid absorbent is the resulting distillation residue.

Ethylene dichloride or 1,2 dichloroethane is a commercially valuable material which may be prepared by the reaction of ethylene and chlorine. The process for carrying out such reactions are set forth in the Landau et al. U.S. Patent Numbers 2,658,087 and 2,658,088. From the commercial viewpoint, the art is confronted by the problem of recovering the dichloroethane in a more efficient, economical and convenient manner, especially from dilute gaseous mixtures thereof.

The discoveries associated with the invention and relating to the solution of the above problems, and the objects achieved in accordance with the invention as set forth herein include the provision of:

The process for the recovery of dichloroethane from a dilute gaseous mixture thereof which comprises contacting it with a higher boiling material and cooling to a temperature in the range of —29° to 15° C., whereby the dichloroethane and higher boiling material are liquified, separating lower boiling materials therefrom, and recovering 1,2 dichloroethane as a distillate from the resulting mixture;

Such processes wherein the distillation residue is the higher boiling material which is mixed with the dilute mixture, and at least 0.1 part of the higher boiling material is used per part of the dichloroethane in the dilute mixtures;

Such processes wherein the mixture is cooled to —29° C.;

Such processes wherein the pressure is at least 3.4 atmospheres, and 1.35 parts of higher boiling material are used per part of the dichloroethane in the dilute mixture;

Such processes wherein the dichloroethane content of the dilute mixture is from 0.1 to 20% by gas volume;

And other objects which will be apparent as detail or embodiments of the invention are set forth hereinafter.

The accompanying drawing sets forth a schematic illustration of a preferred embodiment of the invention.

In order to indicate still more fully the nature of the present invention, the following examples of typical procedures are set forth in which parts and percent mean parts and percent by weight, respectively, unless otherwise indicated, it being understood that these examples are presented as illustrative only and are not intended to limit the scope of the invention.

*Example 1*

Referring to the accompanying drawing, gaseous dilute ethylene feed and vaporized chlorine enter reactor 13 through lines 11 and 12, respectively, and form 1,2 dichloroethane and light and heavy impurities. The reactor effluent passes through lines 14 and 15. Heavy ends or absorbent oil also pass through lines 27 and 15 to the partial condenser 16. Refrigerant is circulated to the indirect cooling means (not shown) through lines 17 and line 18. The partially condensed material passes through line 19 to separator 20 where uncondensable inerts, light hydrocarbons or light ends are removed overhead through line 21. Small amounts of the dichloroethane and heavy ends are also present in this stream. The condensed liquid passes through line 22 to a stabilizer 23 and any light hydrocarbons or light ends present are removed through line 24. These light ends may contain some dichloroethane. The bottoms from the stabilizer 23 pass through line 25 to a distillation column 26 where a 1,2 dichloroethane distillate product is removed through line 28. A heavy ends fraction is removed and recycled to the condenser 16, through lines 27 and 15, for use as absorbent oil.

A dilute dichloroethane mixture is obtained from the reaction of chlorine with about 4% gaseous ethylene, and this mixture contains about 3.2% by gas volume of 1,2 dichloroethane, and may contain about 0.02% of 1,1 dichloroethane, about 0.03% of 1,1,2 trichloroethane (heavy ends or higher boiling material), and the remainder includes light ends, inerts, hydrogen chloride, vinyl chloride and the like boiling materials.

This mixture is subjected to the above described treatment at a pressure of 3.4 atmospheres (absolute) and using 1.35 parts of absorbent oil or heavy ends per part of 1,2 dichloroethane in the dilute mixture. The mixture is cooled to —29° C. A 98.6% recovery of the 1,2 dichloroethane is obtained.

This result is most surprising, especially in view of the much lower recovery obtained by the conventional methods.

An advantage of the present process is that the heavy ends are recycled, and under the steady state conditions of operation, there is no build-up of heavy ends. The heavy ends content of the dilute mixture balances the loss of heavy ends vapor passed out with the light ends.

Comparable results to the foregoing are achieved with various modifications including the following. The 1,2 dichloroethane content of the dilute mixture may be 0.1 to 20% by volume, desirably 2 to 10%, and preferably 3 to 8%. The process may be conducted at a temperature in the range of —29° to 15°, desirably —29° to 5°, and preferably —29° to —19° C. The process may be conducted to a pressure of 1 to 15, desirably 1 to 10, and preferably 2 to 5 atmospheres, absolute.

The relative proportions of absorbent to the dichloroethane in the dilute mixture may be in the range of 0.01 to 14, desirably 0.1 to 7, and preferably 0.2 to 3 parts by weight of the absorbent per part of dichloroethane in the dilute mixture.

The process may be conducted in a batch, continuous, or semi-continuous manner. The distillation and stabilizing columns may be of any convenient type. The absorber oil or higher boiling material should be an inert liquid or solvent for the desired product, from which the product may be recovered readily by distillation. It may be a hydrocarbon or a chlorinated hydrocarbon, and the like.

In view of the foregoing disclosures, variations and modifications thereof will be apparent to one skilled in the art, and it is intended to include within the invention all such variations and modifications except as do not come within the scope of the appended claims.

What is claimed is:

1. A process for recovering 1,2-dichloroethane from a dilute mixture of 1,2-dichloroethane, inert gas and higher boiling material, said dilute mixture being obtained by the chlorination of ethylene, which comprises: contacting said mixture with an additional higher boiling material selected from the group consisting of hydrocarbons and chlorohydrocarbons having a boiling point greater than 1,2-dichloroethane and being formed in said chlorination and cooling said mixture to a temperature between −29° to 15° C., said contacting and cooling steps serving to partially condense said dilute mixture; separating said condensate containing said higher boiling material and said 1,2-dichloroethane from the non-condensed material containing said inert gas; fractionating said condensate; recovering said 1,2-dichloroethane as a distillate and recycling the bottoms as the aforesaid higher boiling material to said contacting step.

2. The process of claim 1 wherein the dilute mixture contains from 0.1 to 20% by volume of 1,2-dichloroethane.

3. The process of claim 1 wherein said dilute mixture and said additional higher boiling material are passed to a cooling zone wherein said partial condensation occurs.

4. The process of claim 1 wherein from 0.1 to 14 parts by weight of the additional higher boiling material are used for each part of 1,2-dichloroethane in the dilute mixture.

5. The process of claim 1 wherein said recovery is performed at a pressure of from about 2 to 5 atmospheres absolute.

References Cited by the Examiner

UNITED STATES PATENTS

| | | | |
|---|---|---|---|
| 1,804,432 | 5/31 | Pollitzer | 62—23 |
| 1,841,279 | 1/32 | Dow | 260—662 |
| 1,950,720 | 3/34 | Egloff | 260—662 |
| 2,099,231 | 11/37 | Ruys et al. | 260—662 |
| 2,321,472 | 6/43 | Engs et al. | |
| 2,393,367 | 1/46 | Hammond | 260—662 |
| 2,658,087 | 11/53 | Landau et al. | 260—662 |
| 2,658,088 | 11/53 | Landau et al. | 260—662 |
| 2,816,148 | 12/57 | Anderson et al. | 55—71 |
| 2,875,586 | 3/59 | Pohl | 55—71 |
| 2,990,914 | 7/61 | Kniel | 55—84 |

FOREIGN PATENTS 713,414   8/54   Great Britain.

REUBEN FRIEDMAN, *Primary Examiner.*

HERBERT L. MARTIN, EUGENE BLANCHARD, EDWARD J. MICHAEL, *Examiners.*

UNITED STATES PATENT OFFICE
CERTIFICATE OF CORRECTION

Patent No. 3,197,941                                        August 3, 1965

John White Colton et al.

It is hereby certified that error appears in the above numbered patent requiring correction and that the said Letters Patent should read as corrected below.

Column 2, line 24, before "boiling" insert -- lower --; line 46, for "conducted to" read -- conducted at --.

Signed and sealed this 8th day of March 1966.

(SEAL)
Attest:

ERNEST W. SWIDER
Attesting Officer

EDWARD J. BRENNER
Commissioner of Patents